US009480095B2

(12) United States Patent
Hrabak et al.

(10) Patent No.: US 9,480,095 B2
(45) Date of Patent: Oct. 25, 2016

(54) SIMPLIFIED PAIRING OF A SECOND DEVICE IN A VEHICLE VIA SHORT RANGE WIRELESS COMMUNICATION

(71) Applicant: GM Global Technology Operations LLC, Detroit, MI (US)

(72) Inventors: Robert A. Hrabak, West Bloomfield, MI (US); Amanda J. Kalhous, Ajax (CA)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/524,384

(22) Filed: Oct. 27, 2014

(65) Prior Publication Data

US 2016/0119961 A1     Apr. 28, 2016

(51) Int. Cl.
*H04W 76/02* (2009.01)
*H04W 4/00* (2009.01)
*H04B 1/3822* (2015.01)

(52) U.S. Cl.
CPC ......... *H04W 76/023* (2013.01); *H04B 1/3822* (2013.01); *H04W 4/008* (2013.01)

(58) Field of Classification Search
None
See application file for complete search history.

(56) References Cited

U.S. PATENT DOCUMENTS

| 2002/0090912 | A1* | 7/2002 | Cannon | H04L 29/12009 455/41.2 |
| 2012/0095642 | A1* | 4/2012 | Nishida | H04L 9/3226 701/31.4 |
| 2012/0161927 | A1* | 6/2012 | Pierfelice | H04L 63/10 340/5.83 |
| 2014/0282877 | A1* | 9/2014 | Mahaffey | H04L 63/0853 726/3 |

* cited by examiner

*Primary Examiner* — Alejandro Rivero
(74) *Attorney, Agent, or Firm* — Christopher DeVries; Reising Ethington P.C.

(57) ABSTRACT

A vehicle communication system and a method of using the system that includes coupling a second device in a vehicle using short range wireless communication (SRWC) based on a pairing of a first device in the vehicle. The method includes the steps of: pairing at the vehicle the first device with a SRWC module, by performing a pairing procedure; after the pairing step, determining an identifying association of the first and second devices; and partially performing the pairing procedure between the SRWC module and the second device based on the pairing of the first device and the identified association.

17 Claims, 3 Drawing Sheets

300

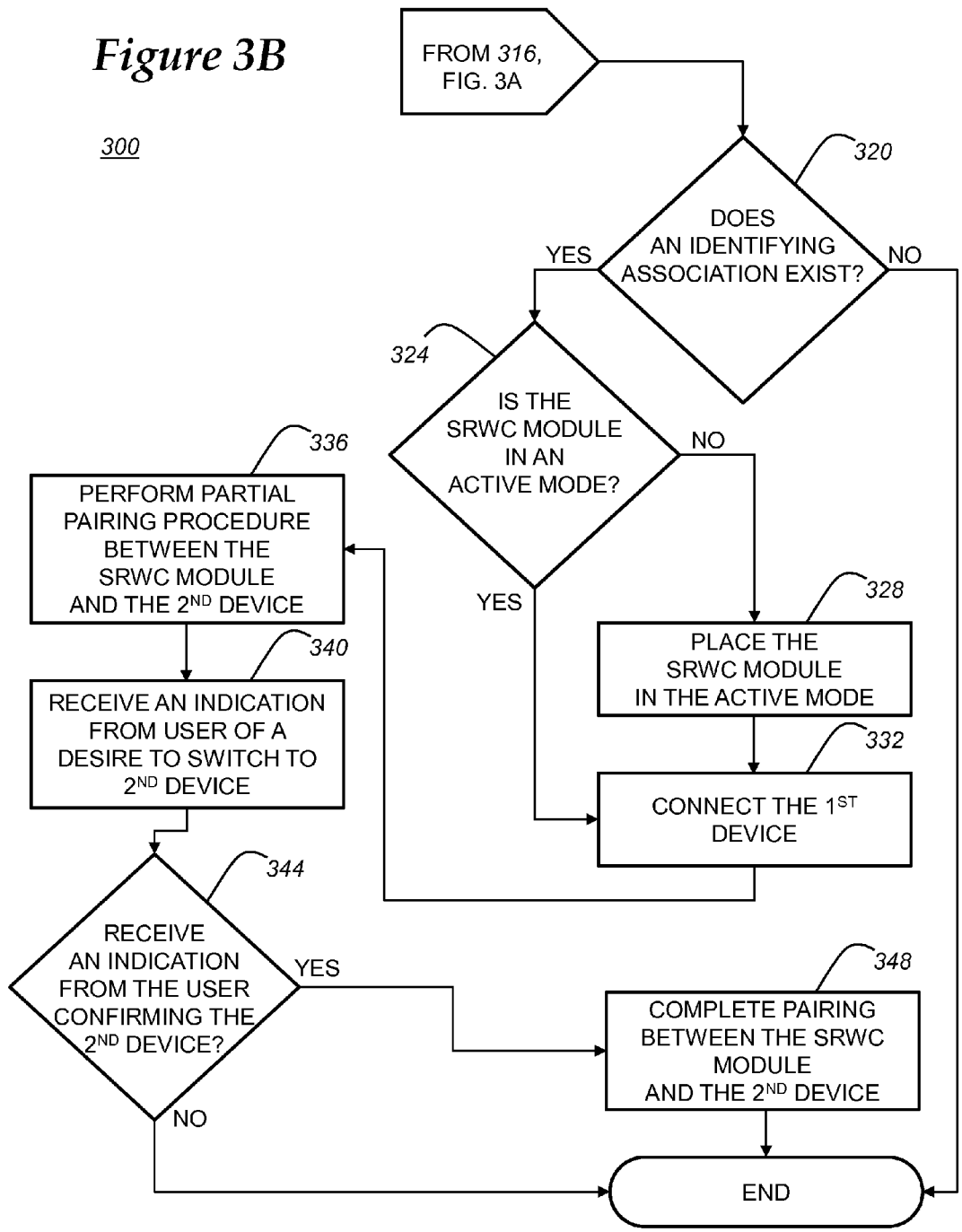

SIMPLIFIED PAIRING OF A SECOND DEVICE IN A VEHICLE VIA SHORT RANGE WIRELESS COMMUNICATION

TECHNICAL FIELD

The present invention relates to pairing a second device in a vehicle when a first device has been previously paired.

BACKGROUND

Modern vehicles are increasingly providing wireless electronics enabling cellular data to be provided to the vehicle. For example, the vehicle may have an embedded telematics unit that receives cellular data and provides it to vehicle occupants. Or for example, the vehicle occupants may receive data via their cellular phones. And in some instances, the telematics unit and cellular phone work together to provide the vehicle occupants wireless data over in-vehicle displays.

SUMMARY

According to an embodiment of the invention, there is provided a method of coupling a second device in a vehicle using short range wireless communication (SRWC) based on a pairing of a first device in the vehicle. The method includes the steps of: pairing at the vehicle the first device with a SRWC module by performing a pairing procedure; after the pairing step, determining an identifying association of the first and second devices; and partially performing the pairing procedure between the SRWC module and the second device based on the pairing of the first device and the identified association.

According to another embodiment of the invention, there is provided a method of coupling a second device in a vehicle using short range wireless communication (SRWC) based on a pairing of a first device in the vehicle. The method includes the steps of: providing a SRWC module in a sleep mode; receiving an indication at the SRWC module that the first device, previously paired with the SRWC module, is within a first determined proximity; receiving an indication at the SRWC module that the second device is within a second determined proximity; determining that the difference between the first and second determined proximities is within a predetermined threshold value; changing the SRWC module from the sleep mode to an active mode based the determining step; and performing a portion of a pairing procedure between the SRWC module and the second device.

BRIEF DESCRIPTION OF THE DRAWINGS

One or more embodiments of the invention will hereinafter be described in conjunction with the appended drawings, wherein like designations denote like elements, and wherein:

FIGS. 3A and 3B are a flow diagram illustrating an embodiment of one of the methods using the communications system shown in FIG. 1.

DETAILED DESCRIPTION OF THE ILLUSTRATED EMBODIMENT(S)

The method(s) described below generally pertain to connecting portable or mobile devices with a vehicle equipped with short range wireless communication (SRWC) capability (e.g., using a Bluetooth protocol). As an example, devices such as a vehicle keyfob or a mobile phone may be wirelessly coupled to a vehicle head unit using a SRWC link. It is becoming more common for vehicle users to have multiple pair-able or SRWC-capable devices. Having multiple devices, the user may have previously paired one device (e.g., for personal use) and not realized that the other device (e.g., for business use) is not paired with the vehicle. As will be appreciated by skilled artisans, pairing such devices with the vehicle head unit can be cumbersome for the vehicle user, and in some circumstances dangerous to the user and others, e.g., where the user is driving. In any case, the user may determine at some point after he/she has started the vehicle that one of his/her devices is not paired causing user frustration.

The present method(s) pertain to automating at least a portion of the pairing process of a second, third, etc. device provided the user has already paired a first device to the vehicle—more specifically, paired the first device to a SRWC module coupled to or a part of the vehicle head unit. This automation mitigates user frustration and promotes vehicle safety by simplifying the pairing process of the second, third, etc. device.

Figure 1:
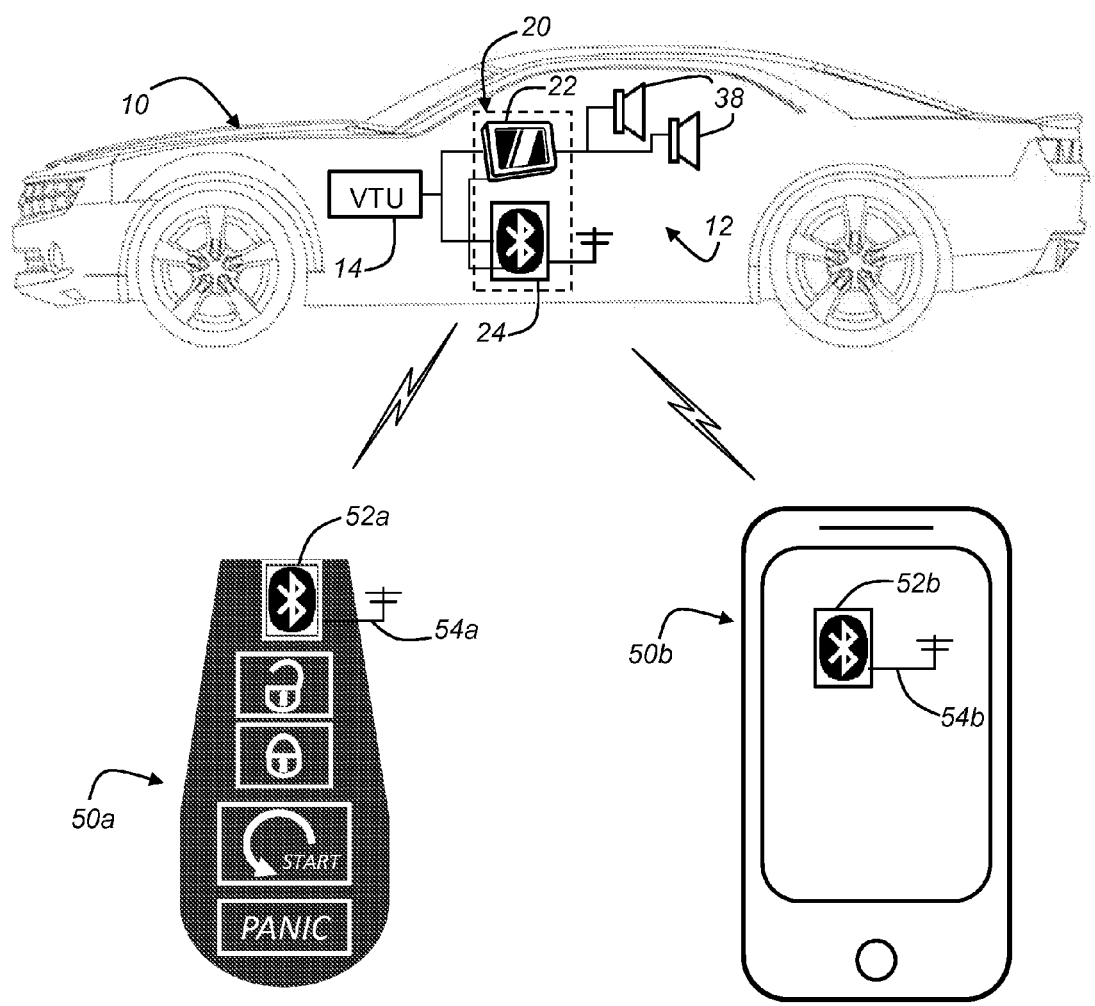
FIG. 1 is a schematic diagram depicting an embodiment of a mobile vehicle communications system that is capable of utilizing the method(s) disclosed herein.
Figure 2:
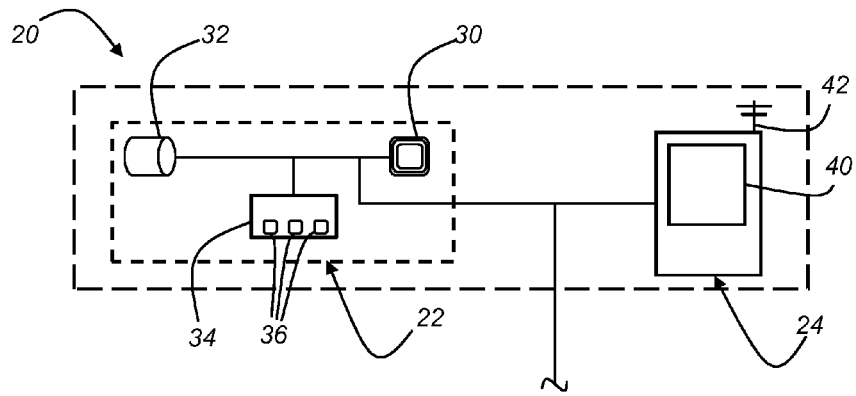
FIG. 2 illustrates a vehicle head unit that is part of the communications system shown in FIG. 1.

FIG. 1 illustrates an operating environment that comprises a vehicle 10 having on-board a communications system 12 that can be used to implement the method(s) disclosed herein. The communications system includes a vehicle telematics unit (VTU) 14 electrically coupled to a vehicle head unit (or vehicle multi-tainment unit) 20 for providing vehicle entertainment and infotainment services (i.e., multi-tainment services) to the vehicle occupants. The head unit 20 may include a primary unit 22 electrically connected to a short range wireless communication (SRWC) module 24 and/or the telematics unit 14. As shown in FIG. 2, the primary unit 22 may comprise one or more processors 30, memory 32, and a display 34, which are described in greater detail below.

Vehicle 10 is depicted in FIG. 1 as a passenger car, but it should be appreciated that any other vehicle including motorcycles, trucks, sports utility vehicles (SUVs), recreational vehicles (RVs), marine vessels, aircraft, etc., can also be used.

As will be appreciated by skilled artisans, the telematics unit 14 may be an OEM-installed (embedded) or aftermarket device that is installed in the vehicle and that enables wireless voice and/or data communication over a wireless carrier system and via wireless networking (i.e., cellular communication). This enables the vehicle to communicate with a central or vehicle call center, other telematics-enabled vehicles, or other entities or devices.

The one or more processors 30 of the vehicle head unit 20 (in the primary unit 22) can be any type of device capable of processing electronic instructions including microprocessors, microcontrollers, host processors, controllers, vehicle communication processors, and application specific integrated circuits (ASICs). They may include one or more dedicated processors used only for head unit 20 or can be shared with other vehicle systems (e.g., the telematics unit 14). Processors 30 execute various types of digitally-stored instructions, such as software or firmware programs stored in memory 32, which enable the head unit 20 to provide a wide variety of services. For instance, processors 30 can execute programs or process data to carry out at least a part of the method discussed herein.

The memory 32 may include computer usable or readable medium, which include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), and magnetic or optical disks or tapes. In at least one embodiment, memory 32 is a non-transitory computer readable medium.

Together, the processor(s) 30 and memory 32 may execute one or more steps of the method embodiments contemplated herein. For example, the method(s) may be performed as one or more computer programs executable by one or more computing devices of or in communication with the vehicle head unit 20 to cause the head unit and/or its respective computing device(s) to perform the method, and the various method related data may be stored in any suitable memory. The computer program may exist in a variety of forms both active and inactive. For example, the computer program can exist as software program(s) comprised of program instructions in source code, object code, executable code or other formats; firmware program(s); or hardware description language (HDL) files.

The display 34 may include any suitable user viewing region using various technologies (e.g., LED, LCD, any other suitable medium, or any combination thereof). The display 34 may or may not be interactive (e.g., touch screen); regardless, the display 34 may have one or more pushbuttons, knobs, controls, or the like 36 for receiving user input. Using the display 34, the head unit 20 may provide a wide variety of services including AM/FM, Satellite, or other wireless radio frequency connections, multimedia access (e.g., for playing CD, DVD, Blu-ray, other suitable media including digitally stored media such as MP3, AAC, WMA, etc.), and internet cloud server access (e.g., via the telematics unit 14). Also, FIG. 1 illustrates that the head unit, more specifically the primary unit 22, may be coupled to one or more speakers 38 for providing multimedia and/or other audio to the cabin of the vehicle 10.

FIG. 2 illustrates that the SRWC module 24 may include a wireless chipset 40 and antenna 42—e.g., for any Bluetooth protocol, Wi-Fi Direct protocol, or other similar, suitable short-range wireless communication protocol. According to at least one embodiment, the chipset 40 is configured for Bluetooth version 4.0 or higher (e.g., commercially recognizable as Bluetooth Smart™ or BLE™ (i.e., Bluetooth Low Energy) or Bluetooth ULP™ (i.e., Bluetooth Ultra Low Power) or Wibree™. While the SRWC module 24 is shown in FIGS. 1 and 2 as part of the vehicle head unit 20, it should be appreciated that in other embodiments the module 24 may be a component separate from the head unit—e.g., a stand-alone component or a component of the telematics unit 14. In all instances, the SRWC module 24 may be electrically coupled the primary unit 22 (e.g., wired or wirelessly coupled).

Returning to FIG. 1, two devices 50a, 50b are shown wirelessly coupled to the vehicle 10, more specifically to SRWC module 20. In the illustration, device 50a is a vehicle keyfob and device 50b is a mobile device each having short-range wireless communication (SRWC) modules 52a, 52b, processors (not shown), memory (not shown), input/output interfaces, and antennas 54a, 54b (respectively). The modules 52a, 52b and antennas 54a, 54b may be structurally and functionally similar to the SRWC module of the vehicle described above, and will not be described in more detail here. Again, the SRWC modules' 52a, 52b capability should be construed broadly to include any suitable protocol (e.g., Bluetooth capability is merely an example). And the illustrated devices 50a, 50b are merely examples—the devices could be other similarly-functioning devices or, for example, both devices may be mobile devices, etc. As discussed with respect to the SRWC module 24, in at least one embodiment, the devices 50a, 50b are configured to operate using Bluetooth version 4.0 or higher.

Keyfobs (e.g., device 50a) also are known to skilled artisans. Keyfobs may be any electronic device having wireless communication capability that enable the vehicle user to remotely perform one or more of the following functions: lock a vehicle door, unlock a vehicle door, start a vehicle engine, turn off a vehicle engine, open a vehicle door, close a vehicle door, and emit an audible panic alarm. The keyfob may or may not include a physical key for a door lock or vehicle ignition or both.

As will be appreciated by skilled artisans, mobile devices may be any electronic device having wireless communication capability. The capability may be wide-range (e.g., cellular), short-range, or both. Nonlimiting examples of a mobile device include a cellular telephone, a personal digital assistant (PDA), a Smart phone, a personal laptop computer or tablet computer, a netbook computer, a notebook computer, or any suitable combinations thereof. Like the keyfob device 50a, mobile devices may be used inside or outside of the vehicle 10. In some instances, mobile devices may be configured to provide services according to a subscription agreement with a third-party facility or wireless/telephone service provider. Some mobile devices may receive wireless data (e.g., packet data or data transmitted over a voice call using known vocoder or codec techniques) from a vehicle call center or remote computers and/or servers (e.g., a cloud server enabling the mobile device to stream media content). Thus, skilled artisans will appreciate that the mobile device (e.g., device 50b) may be paired with a compatible device (e.g., the vehicle's SRWC module 24) and provide wireless, cellular data to the SRWC module 24. The SRWC module may then provide the data to the vehicle head unit 20, speakers 38, etc. for the vehicle occupants. Thus, in some circumstances, the mobile device 50b may relay or retransmit cellular data via a SRWC link between it and the vehicle head unit 20.

The vehicle 10, the head unit 20, and the devices 50a, 50b may be used together by a person known as the vehicle user such as a vehicle driver or a vehicle occupant or passenger. However, the vehicle user does not need to have ownership of the vehicle 10 or the devices 50a, 50b (e.g., the vehicle user may be an owner or a licensee).

Figure 3A:
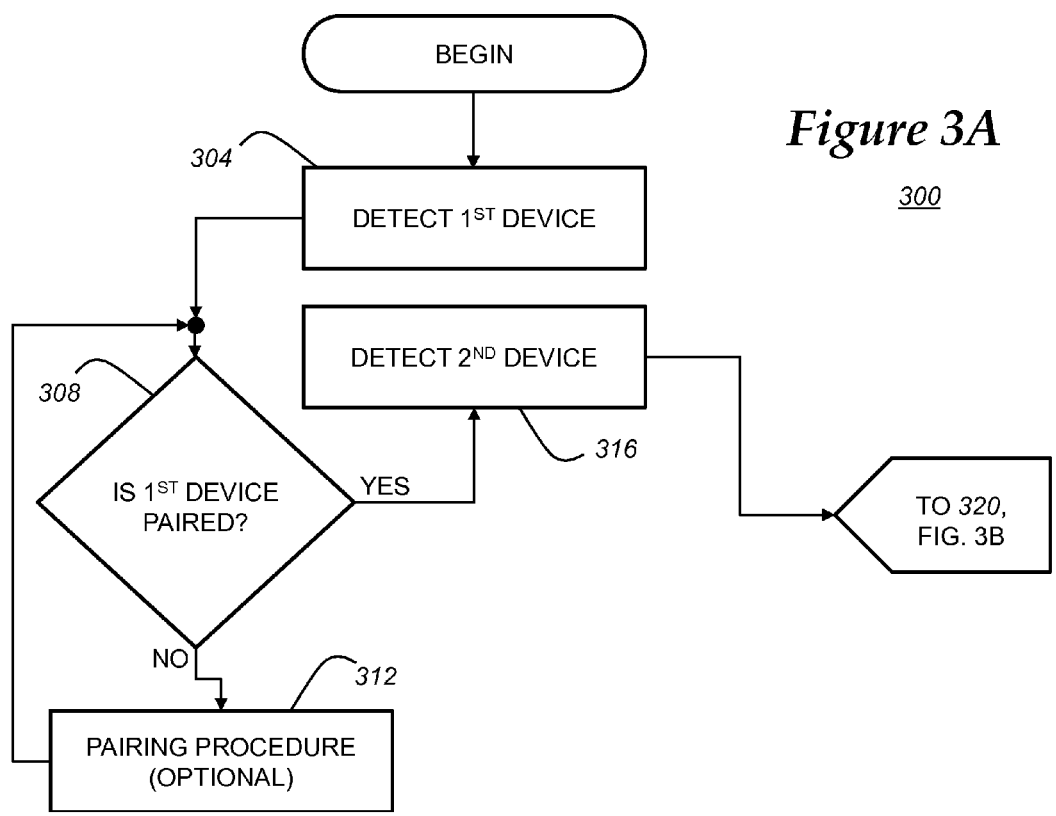

Now turning to FIGS. 3A-3B, the figures collectively illustrate a method 300 of using the communication system discussed above. The method described below is illustrated in a Bluetooth Smart™ environment; however, this is merely an example—e.g., other SRWC protocols may be used instead.

The method begins with step 304 by the SRWC module 24 detecting a first device; for purposes of illustration only, the first device described herein will be the keyfob (50a); however, the first device could also be the mobile device or other suitable device as described above. The SRWC module 24 may detect the keyfob device 50a in a sleep mode or in an active mode. The sleep mode may occur whenever the vehicle engine is OFF or when the head unit 20 is OFF or any other suitable circumstance. For example, the sleep mode may allow the SRWC module 24 to conserve vehicle power while still being capable of detecting a remote start vehicle engine command from the keyfob device 50*a*. In the sleep mode, the SRWC module may perform limited tasks—e.g., it may not typically stream data between it and other devices, nor may it perform pairing procedures with a new (or unpaired) device. These and other tasks may be suitably performable during the SRWC module's active mode.

The detection of the device 50*a* may occur in several ways. For example, the SRWC module may emit a beacon or wireless signal indicating its presence and the keyfob device may respond, or the keyfob device may emit a beacon signal indicating its presence and the SRWC module 24 may respond. Other possibilities exist as well. In the active mode, the beacon signal may occur periodically; and in the sleep mode, the periodicity may be less frequent (e.g., only 10% of the time compared to the active mode). Regardless, the keyfob device 50*a* is detected by the SRWC module 24. Thereafter, the method 300 proceeds to step 308.

In step 308, the SRWC module 24 determines whether it is paired with the keyfob device 50*a*. As will be appreciated by skilled artisans, according to Bluetooth protocols, a device is first paired with another device, and after which, it may be bonded. Bonded devices may detect one another (e.g., as in step 304) and are free to automatically transceive data (i.e., send and/or receive data). Of course, not all Bluetooth protocols may 'bond' (e.g., Bluetooh Low-Energy or BLE does not include 'bonding'); whereas, other classic Bluetooth protocols may include bonding (e.g., HFP, A2DP, AVRCP, etc.). Conversely, unpaired devices must pair prior to such automatic wireless data transception. Thus, according to one embodiment, the SRWC module 24 may simply determine whether the keyfob device 50*a* was previously paired. This too may occur in the sleep or active mode. In at least one embodiment, steps 304 and/or 308 may occur during the sleep mode.

If in step 308 it is determined that the keyfob device 50*a* is not paired, the method 300 may proceed to step 312 and perform a pairing procedure. The pairing procedure may include: providing a shared secret at the SRWC module and the device (e.g., device 50*a*); and receiving an indication of a confirmation from the user via at least one of the SRWC module or device 50*a* that pairing is desired. The confirmation may confirm that both machines possess the same shared secret.

Standardized pairing procedures exist for both legacy and newer devices. For example, according to a legacy pairing procedure, the two machines (e.g., the SRWC module 24 and the device 50*a* or 50*b*) would be required to input a personal identification number (PIN) code. Legacy pairing would only be successful if both machines entered the same PIN code. Legacy systems may include Bluetooth version 2.0 and earlier.

Newer pairing procedures exist (e.g., standardized Simple Secure Pairing (SSP)) for machines capable of using Bluetooth version 2.1 and later. SSP may utilize various methods, including: Just Works, Numeric Comparison, Passkey Entry, and Out of Band (OOB) methods. The Just Works method requires no user interaction—but in some circumstances can also permit the user to confirm that pairing of the two machines is desirable. Numeric Comparison requires both machines to have a display screen to display a numeric code and at least one of the machines to be capable of accepting a binary input (e.g., yes or no). Thus, a user determines whether the numeric codes on each of the machine displays match; if so, a binary 'yes' is input to one of the machines. The Passkey Entry method necessitates that at least one of the machines has a display and the other machine has a numeric key/entry means (e.g., a keypad). In one implementation, the display of one machine provides a numeric code and the user enters the numeric code into the numeric entry means of the other machine. And in another implementation, both machines have a numeric entry means—and user enters the same numeric code into both machines. Lastly, in the OOB method, Near Field Communication (NFC) is used with an OOB mechanism to exchange information during the pairing procedure and requires identifying information from the OOB mechanism.

According to at least one embodiment of the present disclosure, the pairing procedure is a newer procedure (e.g., Bluetooth version 2.1 or later). More specifically, at least one embodiment uses the Just Works method or the Numeric Comparison method. For example, the confirmation received in step 312 may be the confirmation of Just Works or the binary input (yes or no) of Numeric Comparison. Following the pairing procedure, the method proceeds to step 308 again. This loop may occur repetitively and not proceed further until at least one detected device is paired.

But if in step 308 it is determined that the keyfob device 50*a* is paired, the method proceeds to step 316. In step 316, the method may detect a second device (e.g., the mobile device 50*b*). As discussed above with respect to the first device, the second device may be any suitable device (e.g., not necessarily the mobile device illustrated). Also, the detection of the second device may be similar to that described in step 304 and will not be further elaborated here. For the sake of illustration and as will be discussed below, the second device 50*b* will be an unpaired device. After detecting the second device, the method proceeds to step 320.

In step 320, the SRWC module 24 may determine whether an identifying association exists between the devices 50*a*, 50*b*. This may be determined in a variety of ways. For example, each device may store or otherwise have an identifier, and each of these identifiers may be known or verifiable by the head unit 20. Nonlimiting examples of identifiers include: a Media Access Control (MAC) address of the device, a serial number of a device component (e.g., of a SRWC chipset or microprocessor chip), an IP address, just to name a few examples. These identifiers may be saved in head unit memory 32, in telematics unit memory, or may be received via the telematics unit from a call center's backend services or other remote servers (e.g., where the identifier of the device—50*a* or 50*b*—was previously stored there for such use).

In at least one embodiment of step 320, the identifying association may comprise determining whether the keyfob device 50*a* is within a predetermined distance of the proximity of the mobile device 50*b*. For example, according to one embodiment, the SRWC module 24 may determine the received signal strength indication (RSSI) of each of the first and second devices 50*a*, 50*b*—e.g., proximity data including two values: $RSSI_a$ and $RSSI_b$. According to one implementation, the difference of the $RSSI_a$ and $RSSI_b$ values must be within a predetermined threshold value (e.g., approximately −3 decibels (dB)). To illustrate: in one Bluetooth Smart™ implementation, a difference of −3 dB may be correlated to approximately 0.5 meters of distance; e.g., this may occur when an RSSI of −40 dB equates to approximately 1 meter of distance between the SRWC module 24 and the device (e.g., 50*a* or 50*b*), an RSSI of −46 dB equates to approximately 2 meters, an RSSI of −52 dB equates to approximately 3 meters, etc. Thus, if the keyfob and mobile devices are assumed to be approximately 0.5 meters away from one another, it may be assumed that they are being carried by the same vehicle user—this may be adequate to determine in step 320 that the identifying association exists. As will be explained below, if the first and second devices are assumed to have the identifying association, the method may partially pair the mobile device (which was not previously paired). If however, the decibel difference exceeds the predetermined threshold value, it may be assumed that the keyfob and mobile devices do not have an identifying association (e.g., being carried by different users, or the vehicle user and different person) and no partial pairing of the mobile device 50b will occur. It should be appreciated that the RSSI values provided are merely an example; other values or RSSI scales may be used and a different predetermined threshold value also may be used. Further, RSSI is merely one means for determining proximity; thus, other means also may exist.

In at least one embodiment, steps 316 and/or 320 may occur during the sleep mode. If in step 320, the method determines that no identifying association exists between the devices 50a, 50b, the method ends. However, if the method determines that the identifying association exists, then it proceeds to step 324.

In step 324, the method determines whether SRWC module 24 is in an active mode. If the SRWC module is already in the active mode, then the method proceeds to step 332. And if the SRWC module is not active (e.g., in the sleep mode), then the method proceeds to step 328 placing the SRWC module in the active mode; i.e., waking up the SRWC module 24. Step 332 also follows step 328. Thus, the SRWC module 24 may switch between sleep and active modes while the vehicle engine is ON or OFF. The ability of the SRWC module to switch to the active mode while the engine is OFF enables the SRWC module to perform the partial pairing steps described below—thereby saving the vehicle user time and effort to perform these steps manually (e.g., with respect to the 'pairing procedure' described above).

In step 332, the SRWC module 24 and keyfob device 50a connect and are able to wirelessly transceive data with one another. As previously discussed, this connection typically occurs automatically with two previously paired (bonded) devices which are both active and transmission ready. This step may occur earlier as well—e.g., whenever the SRWC module 24 and keyfob device 50a are within SRWC range and both machines are active. The method then proceeds to step 336.

In step 336, the method 300 performs a partial pairing procedure between the SRWC module 24 and the mobile device 50b. The partial pairing procedure may include: (a) having a shared secret at the SRWC module (e.g., at least temporarily storing in memory 32); (b) having the shared secret at the device 50b (e.g., in memory); and (c) being ready to complete the pairing procedure upon receipt of a confirmation indication from the user (e.g., from either the SRWC module or device 50b). Thus according to at least one embodiment, the partial pairing procedure may include all pairing procedure steps that make the two machines 'paired' or bonded except the confirmation receipt, and the confirmation receipt may be received via the SRWC module 24. User confirmation, especially via the SRWC module, will mitigate the possibility of malicious attacks—e.g., a man-in-the-middle or MITM attack. After step 336, the method proceeds to step 340.

In step 340, the method receives an indication from the vehicle user that the user desires to switch from any SRWC link with device 50a and utilize a SRWC link with the device 50b. Consider for example that device 50b is the user's business phone, and the user wishes to place a hands-free business phone call using vehicle electronics including the SRWC module 24. In many instances, the user is the vehicle's driver and this phone call occurs while the user is driving. However, no SRWC link yet exists (i.e., device 50b was never paired with the SRWC module 24). Without the methods disclosed herein, the user must first pair the device 50b with the SRWC module 24 before executing the hands-free call which may include navigating through the vehicle head unit's software menu to find and attempt the pairing procedure. The present disclosure does not require the user to complete the entire pairing procedure; instead, the user need only confirm the partial pairing procedure already implemented in step 336.

Step 344 may present the user a prompt or query on requesting the user to confirm that the vehicle is to be paired with mobile device 50b. The query may be visually presented (e.g., via the display 34) or audibly presented (e.g., via the speakers 38), just to name a few examples. Step 344 may include a numeric code, a passkey code (e.g., alphanumeric), a binary query, or any other suitable query. In addition, the query or at least the code, may be presented on the mobile device 50b as well.

If the user fails to confirm the mobile device 50a, the method ends without pairing the mobile device; however, if the mobile device is confirmed, then the method proceeds to step 348. Confirmation may occur via one or more push-buttons 36 or via a touchscreen input or via an audio confirmation (e.g., using automatic speech recognition techniques—which are known to skilled artisans).

In step 348, the pairing of the SRWC module 24 and the mobile device 50b is completed; thus, afterwards the machines are paired/bonded. Once device 50b is bonded and thereafter connected with the SRWC module, the device may transceive data via any suitable SRWC (e.g., such as the Bluetooth protocol discussed above). After step 348, the method 300 may end. It should be appreciated that steps 320-336 may all occur while the vehicle engine is OFF, the engine is ON, or even some steps while the engine is OFF and others while it is ON. Thus, before or shortly after the user enters the vehicle 10, the partial pairing procedure is completed for mobile device 50b. Thus, should the user desire to switch to device 50b upon entering the vehicle, the pairing procedure can be completed quickly following the user's confirmation in step 344.

Other embodiments also exist. For example, the user may approach the vehicle 10 when the engine is OFF carrying three mobile devices—only one of which is previously paired. The method described above should be construed broadly—so as to enable the second and third unpaired devices to be partially paired.

In another embodiment, step 344 may be omitted using JUST WORKS pairing without confirmation. However, skilled artisans will appreciate that this pairing may be subject to malicious attack (e.g., a MITM attack).

Thus, there has been described various methods for partially auto-pairing a vehicle user's second SRWC-capable device. A partial-auto pair procedure may be performed while an embedded SRWC module is in a sleep mode and, at least in some instances, the pairing and bonding of the second device may be finished with a simple user confirmation.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of coupling a second device in a vehicle using short range wireless communication (SRWC) based on a pairing of a first device in the vehicle, comprising the steps of:
   pairing at the vehicle the first device with a vehicle SRWC module, by performing a pairing procedure;
   after the pairing step, determining an identifying association of the first and second devices, wherein the identifying association includes determining at the SRWC module whether the first device is within a threshold proximity of the second device, including:
   receiving an indication at the SRWC module that the first device is within a first proximity;
   receiving an indication at the SRWC module that the second device is within a second proximity;
   determining a difference between the first and second proximities; and
   determining that the first device is within the threshold proximity of the second device when the difference is less than or equal to a predetermined value; and
   when the first device is within the threshold proximity of the second device, then performing at least part of a pairing procedure between the SRWC module and the second device.

2. The method of claim 1, wherein the at least part of a pairing procedure includes: automatically performing the at least part of a pairing procedure by providing a shared secret at both of the SRWC module and the second device, further comprising later performing any remaining part of the at least part of a pairing procedure, including: receiving a confirmation at one or both of the SRWC module and the second device, the confirmation indicating that each has the same shared secret.

3. The method of claim 1, wherein a shared secret between the SRWC module and the first device differs from a shared secret between the SRWC and the second device.

4. The method of claim 1, wherein the SRWC module is in a sleep mode when the SRWC module determines the identifying association.

5. The method of claim 4, further comprising changing the SRWC module from the sleep mode to an active mode when the first and second devices have the identified association.

6. The method of claim 5, further comprising:
   receiving an indication from a user confirming a shared secret of the second device;
   performing a remainder of the at least part of a pairing procedure between the SRWC module and the second device; and
   connecting the second device to the SRWC module.

7. The method of claim 6, further comprising:
   connecting the first device to the SRWC module based on the pairing of the first device; and
   transceiving data at a vehicle head unit, via the SRWC module and the first or second device.

8. The method of claim 1, wherein the SRWC includes a Bluetooth protocol.

9. The method of claim 8, wherein the Bluetooth protocol includes version 2.1 or later.

10. A method of coupling a second device in a vehicle using short range wireless communication (SRWC) based on a pairing of a first device in the vehicle, comprising the steps of:
    receiving at a vehicle SRWC module in a sleep mode an indication that the first device, which was previously paired with the SRWC module, is within a first proximity;
    receiving an indication at the SRWC module that the second device is within a second proximity, wherein the first and second proximities are determined by the SRWC module;
    determining at the SRWC module that the difference between the first and second proximities is within a predetermined threshold value; and
    in response to determining that the difference between the first and second determined proximities is within the predetermined threshold value, then:
    triggering the SRWC module from the sleep mode to an active mode; and
    performing a portion of a pairing procedure between the SRWC module and the second device.

11. The method of claim 10, wherein the previous pairing of the first device and the SRWC module includes using a shared secret at both the SRWC module and the first device, wherein the pairing procedure comprises receiving a confirmation at one or both of the SRWC module and the second device indicating the SRWC module and the second device have the same shared secret.

12. The method of claim 10, further comprising connecting the first device to the SRWC module based on the pairing of the first device and the first proximity.

13. The method of claim 12, further comprising:
    receiving an indication from a user confirming a shared secret of the second device;
    performing the remainder of the pairing procedure between the SRWC module and the second device; and
    connecting the second device to the SRWC module.

14. The method of claim 13, further comprising receiving data at a vehicle multi-tainment unit (VMU) via the SRWC module and the first or second device.

15. The method of claim 13, further comprising: prior to receiving the indication confirming the shared secret, receiving an indication from the user that the user desires to use a SRWC link between the SRWC module and the second device.

16. A method of coupling a second device in a vehicle using short range wireless communication (SRWC) based on a pairing of a first device in the vehicle, comprising the steps of:
    pairing at the vehicle the first device with a SRWC module, by performing a pairing procedure;
    connecting the first device to the SRWC module based on the pairing procedure;
    after the pairing step, determining an identifying association of the first and second devices, wherein the identifying association includes determining at the SRWC module a threshold proximity between the first and second devices; and
    when the first and second devices are within the threshold proximity, then:

automatically performing only part of a pairing procedure for the second device using the SRWC module, wherein the automated part of the pairing procedure excludes receiving a confirmation by a user of the second device; and completing the pairing procedure when the SRWC module receives the confirmation from the second device.

17. The method of claim 16, wherein the confirmation is received at the SRWC module in response to user input at the second device.

* * * * *